Figure 1:
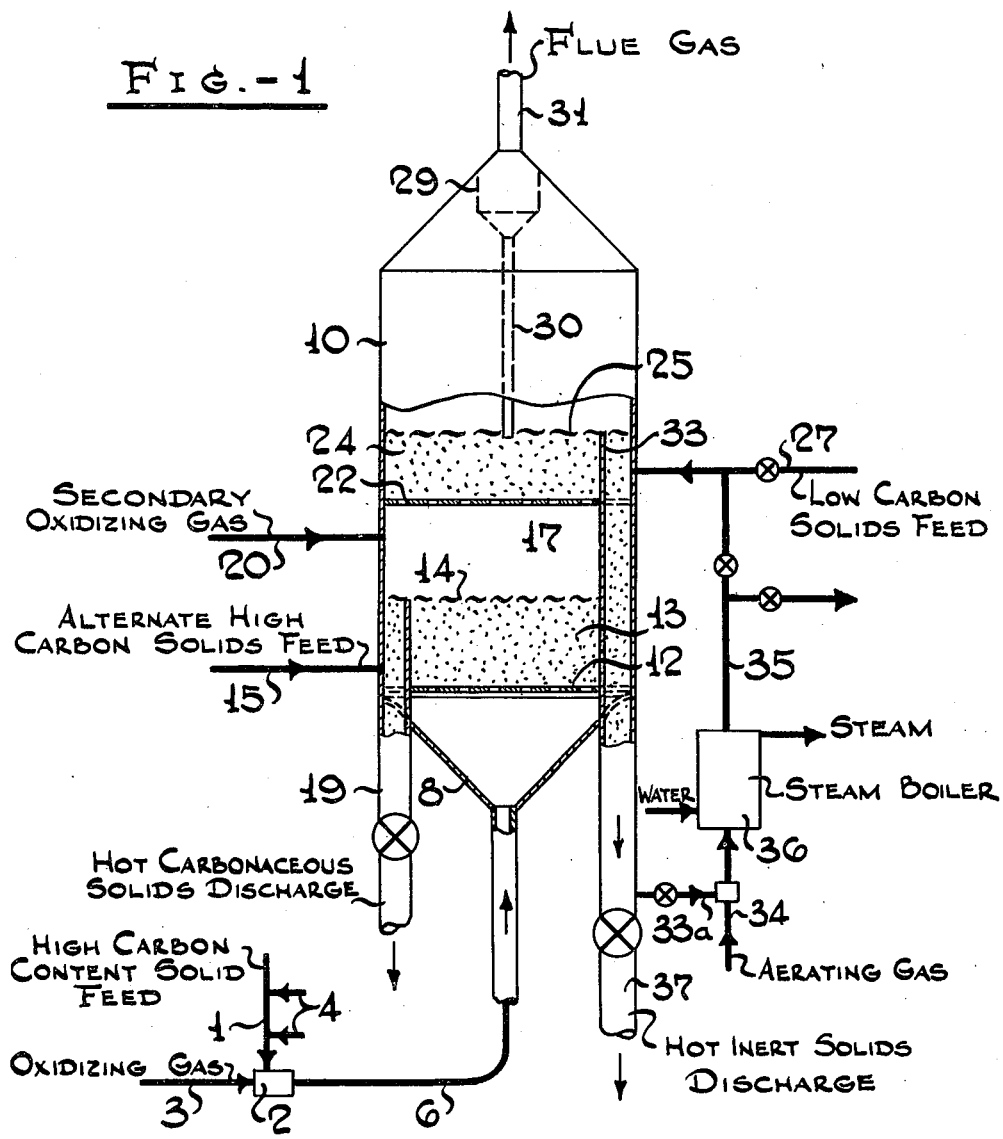

March 4, 1952 — F. T. BARR ET AL — 2,588,075
METHOD FOR GASIFYING CARBONACEOUS FUELS
Filed Dec. 18, 1945 — 3 Sheets-Sheet 1

Frank T. Barr
Bruno E. Roetheli
Walter G. Scharmann
Inventors
By R. J. Whelan Attorney

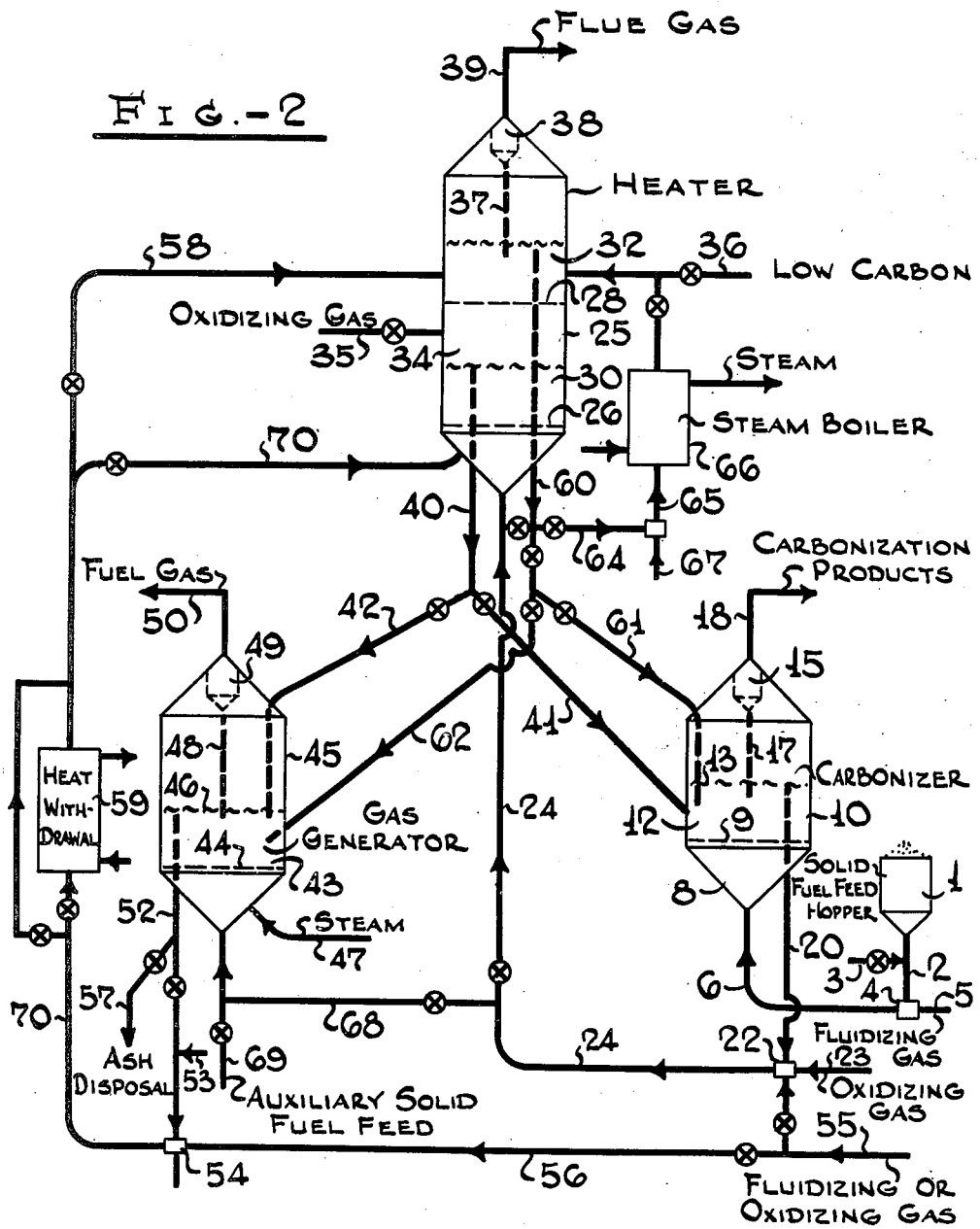

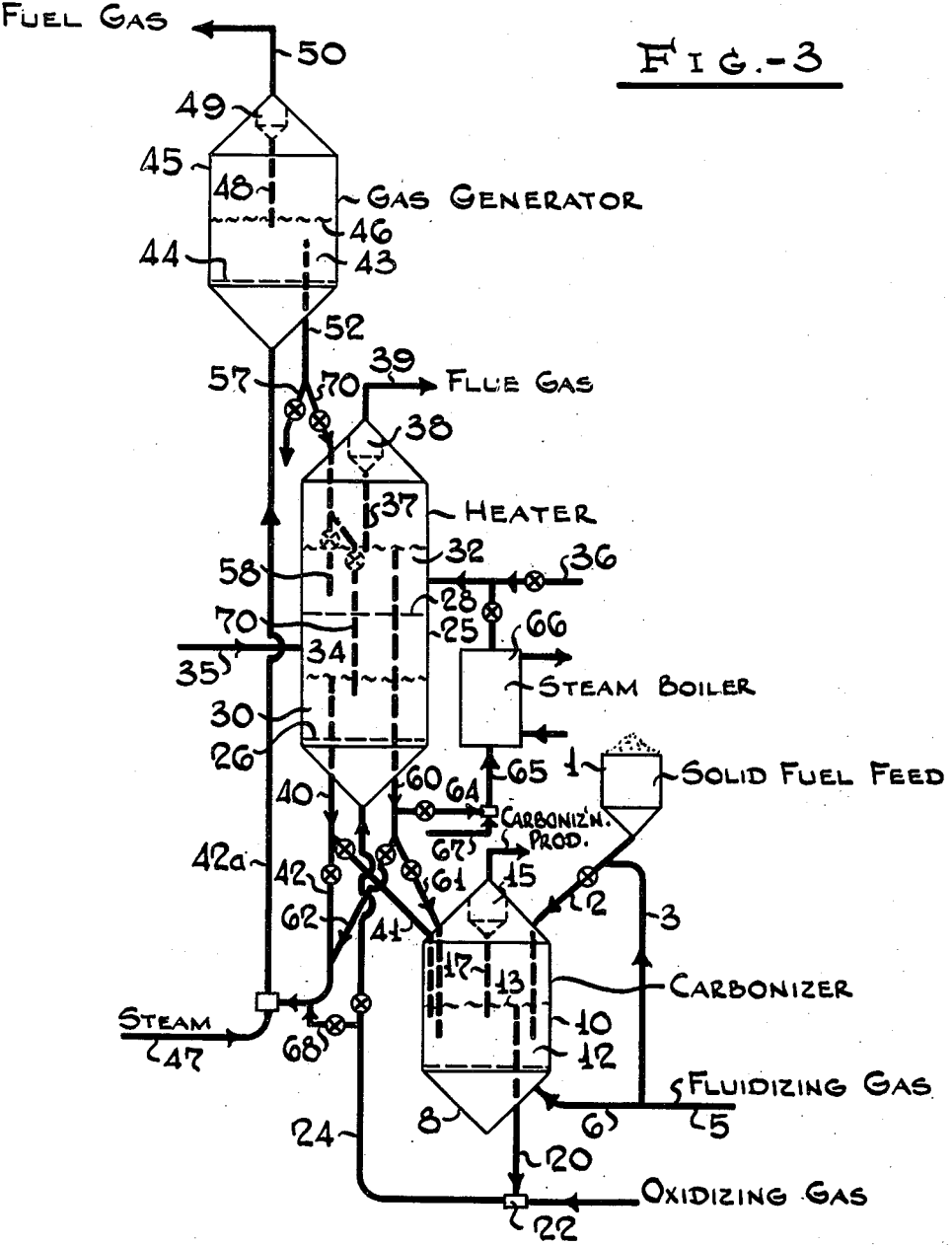

Patented Mar. 4, 1952

2,588,075

UNITED STATES PATENT OFFICE 2,588,075

METHOD FOR GASIFYING CARBONACEOUS FUELS

Frank T. Barr, Summit, Bruno E. Roetheli, Cranford, and Walter G. Scharmann, Westfield, N. J., assignors to Standard Oil Development Company, a corporation of Delaware Application December 18, 1945, Serial No. 635,762

22 Claims. (Cl. 48—206)

The present invention relates to an improved process for the efficient utilization of solid carbonaceous fuels, such as coal, coke, peat, tar sands, oil shales, and the like, and more specifically to a process for the efficient generation of heat from said solid carbonaceous materials.

In the generation of heat by the combustion of solid fuels with air the principal products of combustion are carbon monoxide, carbon dioxide and water. It is known that most efficient utilization of both the carbon of fuels and the oxygen of the air is obtained in a heater burning solid fuels by conducting the combustion in such a manner as will produce carbon dioxide in preference to carbon monoxide. Formation of carbon monoxide instead of carbon dioxide in the combustion reaction consumes more carbon and requires more oxygen per unit of heat generated, as illustrated by the following equations:

$$C + O_2 = CO_2 + 94,400 \text{ cal.}$$
$$C + 1/2 O_2 = CO + 26,700 \text{ cal.}$$

In various processes involving the generation of heat by the combustion of solid carbonaceous material, such as the manufacture of fuel gases, for instance water gas, in alternating make and blow periods, air-blown coking operations, and the like, the formation of carbon monoxide in the combustion stages cannot be avoided because hot carbon, which by the nature of these processes must be present in excess, has a strong tendency to reduce carbon dioxide to carbon monoxide by a reaction which consumes part of the heat generated by the original formation of carbon dioxide. These conditions exist no matter whether the combustion processes mentioned are carried out by blowing air or another oxidizing gas through a fixed bed of coarse pieces of solid fuels or the fluid solids technique is applied, that is to say the solid fuel is burned in the form of fine particles maintained by an aerating gas in the form of a dense, turbulent suspension having flow and heat transfer characteristics similar to those of a liquid.

The loss in calorific efficiency caused by the formation of substantial proportions of carbon monoxide in the generation of heat by the combustion of solid fuels is of particular importance in such processes as involve the utilization of the hot solid combustion residue to supply the heat required by various endothermic chemical reactions such as the manufacture of gases containing carbon monoxide and hydrogen, for instance water gas or synthesis gas for the synthetic production of hydrocarbons, the coking and cracking of solid and liquid carbonaceous materials, and the like. Such processes contemplate, for instance, a continuous circulation of solid carbonaceous coking or gasification residue in a fluidized state from the conversion zones to a heater in which heat is generated by combustion of the carbonaceous constituents of the residue, and recirculation of the highly heated solid fluidized combustion residue to the conversion zones to supply the heat required therein. This technique ordinarily involves circulation from the heater to the conversion zones of quantities of non-conversion materials considerably in excess of the amount of carbon used in the conversions, in order to supply the large amounts of heat required in the conversions. While for this purpose the non-conversion material might be unreacted conversion material, such as coke or coal, a circulation of the required large excess of coke or coal to the heater establishes in the latter conditions most favorable to the formation of carbon monoxide and conducive to the loss of calorific efficiency.

In these cases the ratio of fluidized solids to combustion air circulation rate is fixed by heat transport considerations; the time of contact of carbon with air is controlled primarily by maintaining carbon concentration in the circulating solids stream at the proper level. In the carbonization of coal and the manufacture of water gas, however, losses of solids from the fluid beds are often larger than the amount of ash charged to the system in the fresh coal. This tends to increase the carbon concentration in the fluid beds. For instance, if loss such as suspended material in the discharge gas or the like is twice as much as the amount of ash charged to the system, average concentration of process solids in the ash in the solids circulating stream must build up to about 50% of the total. Such concentration is conducive to CO formation in the combustion zone, as outlined above. One method of avoiding this increase in carbon concentration is to reduce losses to an amount equal to the ash to be rejected. This is often difficult and expensive, and control of the amount of loss is not as close and responsive as would be desired. Moreover, when combustion of carbon in the combustion zone is caused to go completely to carbon dioxide by maintaining a low carbon concentration in the combustion zone, the carbon concentration of the solids entering the gas generation zone may be, for example, as low as 0.8% and that of the solids leaving the gas generator as low as 0.2%, which would be just enough carbon to provide the necessary heat by combustion in the combustion zone. Under these circumstances, the fuel gas is produced in the gasification zone from the carbon-heat carrier mixture at a carbon concentration as low as about 0.2%. At this low level a considerable excess volume of fuel gas generating space must be provided in order to bring about the desired reactions.

It has also been suggested to repress carbon monoxide formation by using thin fuel beds, thereby minimizing the opportunity for secondary reaction of carbon dioxide with additional carbonaceous material. However, this technique, while valuable, is not entirely satisfactory since it involves either incomplete conversion of the oxygen supplied or incomplete repression of the secondary reaction, depending on conditions employed; use of the thin bed also introduces a number of operating difficulties, such as uneven air flow, lack of homogeneity in the distribution of combustibles in the bed, etc. Furthermore, in the conversion of coal or coke to gas or in the use of coal or coke as heating material in a fluidized solids operation, the amounts of make- and flue-gas or -vapor are frequently so large that considerable useful process material is lost unless relatively expensive recovery equipment is installed. Thus, a coal with 5% ash may produce sufficient make- and flue-gas to carry out as much as 50% of the input solids instead of the 5% which would be desirable for rejection of the ash content.

The present invention overcomes the aforementioned difficulties and affords various additional advantages. These advantages, the nature of the invention and the manner in which it is carried out will be fully understood from the following description thereof read with reference to the drawing which shows a semi-diagrammatic view of apparatus particularly adapted to carry out the invention.

It is the main object of our invention to provide a process for the efficient generation of heat from solid carbonaceous materials.

Another object of our invention is to provide a process for conducting the combustion of solid carbonaceous materials in such a manner as will produce $CO_2$ in preference to CO as gaseous combustion product.

A further object of our invention is to promote the combustion of solid carbonaceous materials to $CO_2$ in preference to CO in a combustion zone operated by the fluid solids technique.

Another object of our invention is to promote the combustion of solid carbonaceous materials to $CO_2$ in preference to CO in a combustion zone which is operated by the fluid solids technique and from which solid highly heated residues are used to maintain heat-consuming operations, for example, the reaction in a zone or zones for converting solid into fluid fuel, and which receives a solids supply from at least one of these operations.

Other objects and advantages of our invention will appear hereinafter.

We have found that these objects may be accomplished quite generally by subjecting the solid fuels to combustion with the aid of an oxidizing gas in a bed of relatively high carbon concentration and passing hot combustion gases containing carbon dioxide and carbon monoxide together with oxidizing gas through a second bed of solids having a carbon concentration sufficiently low to promote complete combustion of carbon monoxide to carbon dioxide by surface action while avoiding the reduction of carbon dioxide to carbon monoxide by excess carbon. Solids suitable for use in the solids bed of low carbon concentration comprise such low-cost, inert material as sand, clay, ordinary furnace ash or ash from the solid fuel used in the combustion zone or the like. Catalytic material capable of increasing oxidation reaction rates, such as iron oxide, iron ore, rusty scrap iron, high-iron clays, red mud, spent cracking catalysts, and numerous other substances having a similar catalytic effect may be likewise used either alone or in mixture with the inert materials mentioned above. The carbon concentration in the bed of high carbon concentration may range as high as 80% or higher, while that of the bed of low carbon concentration should be not higher than 5% and preferably below 0.5% of the solids present.

The temperature in the solid fuel bed of high carbon concentration may be controlled to fall within the wide limits embracing the operative range of solid fuel combustion, say from about 1000° to about 2500° F. or higher, depending on the heat requirements of the endothermic reaction or other heat-consuming operation for which the heat generated in the combustion zone is to be utilized. Usually these temperatures range from about 1600° to about 2000° F. The combustion gases may enter the second solids bed of low carbon concentration at or about the temperature attained in the first combustion zone and thus establish the temperature level required to initiate the combustion of carbon monoxide to carbon dioxide in the second combustion zone. Additional oxidizing gas may be added to the solids bed of low carbon concentration to accomplish the desired complete combustion of carbon monoxide to carbon dioxide. However, under certain conditions, such as short contact times, the amount of unreacted oxygen remaining in the combustion gases leaving the combustion zone of high carbon concentration may be sufficient to convert substantially all the carbon monoxide to carbon dioxide so that the supply of additional oxidizing gas may be dispensed with, if desired. The temperature in the bed of low carbon concentration tends to rise above that maintained in the preceding zone due to the heat generated by the supplemental combustion of carbon monoxide to carbon dioxide. If desired, sufficient heat may be withdrawn from the low-carbon combustion zone to establish a constant temperature level which for most purposes may lie between the approximate limits of 1600° and 2500° F.

It will be understood that more than one bed containing solids of low carbon content may be provided to obtain further combustion of any residual combustible materials, if desired. The various beds of relatively high and low carbon concentration may be arranged in a single vessel or, if desired, in separate vessels, the proper number of vessels and beds arranged therein depending mainly on considerations of design and cost. In general, if the carbon concentration of the low-carbon solids is kept sufficiently low, the high-carbon solids may contain any desired proportion of carbon without interfering with an ultimate complete combustion of the carbon available to carbon dioxide.

Our invention affords particularly great advantages when applied to a combustion zone or heater operated by the fluid solids technique, wherein solid fuel is burned in a bed of fine fuel particles maintained by an aerating gas in the form of a dense turbulent suspension having the characteristics of a boiling liquid. In accordance with a preferred modification of this embodiment of our invention, the solid fuel is burned in a fluidized bed containing the fuel to form combustion gases comprising carbon dioxide and carbon monoxide and the combustion gases are passed to at least one other fluidized bed of solids of low carbon concentration to effect substantially complete combustion of carbon monoxide to carbon dioxide. In this case, all or part of the solids of low carbon concentration, instead of being fed to the system from an extraneous source, may be supplied in the form of solid combustion residue carried over by combustion gases from the preceding fluidized combustion zone. This may be accomplished by a proper control of the gas velocities in the various zones, for instance by a suitable increase of the gas velocity in the combustion zone from which the low-carbon solids are to be supplied. If desired, the effect of any carbon which may be carried over in this manner from a high-carbon to a low-carbon bed may be counterbalanced by adding, continuously or periodically, inert solids, such as sand or ash, in proper amounts to the low-carbon bed. This added inert material may also serve to prevent excessively high temperatures from developing in the low-carbon bed or beds.

The latter effect may also be accomplished by circulating the solids from the low-carbon bed, continuously or periodically, to a heat removal device such as a boiler for producing steam and from there back to the low-carbon bed. This method of heat control has particular significance when the heat generated in the combustion zones is to be utilized in the form of sensible heat of the fluidized solids to support endothermic reactions, for example the carbonization and/or gasification of solid carbonaceous materials, in accordance with one of the important objects of our invention.

Having set forth the general nature and objects, the invention will be best understood from the more detailed description hereinafter, in which reference will be made to the accompanying drawing wherein Fig. 1 is a partly schematic and partly diagrammatic illustration of a heater suitable for carrying out a preferred modification of the present invention;

Fig. 2 is a partly schematic and partly diagrammatic illustration of a system of reaction zones to which heat is supplied in accordance with the present invention; and Fig. 3 is a partly schematic and partly diagrammatic illustration of a modification of the system shown in Fig. 2.

Referring now in detail to Fig. 1, finely-divided carbonaceous solids of relatively high carbon content, such as coal, coke, coke-gasification residue or the like are supplied by any conventional means (not shown) to line 1 and passed to a dispersing chamber 2 where they are mixed with an oxidizing gas, such as air and/or oxygen, supplied through line 3. The particle size of the finely-divided solids may vary from less than 100 mesh up to ¼ or ½ inch. Line 1 may have the form of a vertical standpipe well known in the fluid solids technique, an aerating gas such as steam, air, flue gas, etc. being added through lines 4, if desired. To start up the process, the oxidizing gas supplied through line 3 and/or the carbonaceous solids fed through line 1 may be preheated to temperatures suitable for initiating the combustion of carbon. The mixture of solids and oxidizing gas is passed, if desired, under the pseudo-hydrostatic pressure of standpipe 1 through line 6 to lower conical section 8 of an essentially cylindrical combustion zone or heater 10. The cylindrical section of heater 10 is separated from the conical bottom section 8 by a distributing grid 12 through which the mixture of carbonaceous solids and oxidizing gas passes into the cylindrical section to form above grid 12 a dense turbulent suspension 13 resembling a boiling liquid and having a well-defined upper level 14. A part or all of the finely-divided high-carbon solids may be supplied to the fluidized bed 13 above grid 12 through line 15 by any suitable mechanical or pseudo-hydrodynamic means known in the art (not shown). In the fluidized bed 13 a sufficient amount of carbon may be converted to $CO_2$ and CO to produce a temperature of about 1600° to 2000° F., which may be accomplished by supplying that amount of oxygen which will burn carbon sufficient to supply the heat required. The temperature within bed 13 may be readily maintained at any desired level between about 1000° and 2000° F. by a proper control of the oxygen supply and the velocity of the oxidizing gas. Products of the combustion include $CO_2$ and a substantial proportion of CO formed by reduction of $CO_2$ by unburned carbon, which vary depending on conditions maintained in the lower bed. A mixture of minor concentrations of finely-divided solids and gas containing CO, $CO_2$ and nitrogen, if air is used as the oxidizing gas, enters the free space 17 from the fluidized solids bed 13. The oxygen content of the gas mixture leaving bed 13 depends on the completeness of the reaction in bed 13 but is preferably maintained at a low level. Highly heated fluidized solids of reduced carbon content are withdrawn from bed 13 through overflow-standpipe 19 and may be used substantially at the temperature level of bed 13 as a heat carrier in any desired heat-consuming operation. If desired, the hot gas mixture in space 17 may be supplied through line 20 with sufficient oxidizing gas to permit substantially complete conversion of its CO content to $CO_2$. This secondary oxidizing gas may be preheated to any desired temperature, preferably by utilization of waste heat from heater 10 in any conventional manner. The gas mixture, enriched with oxygen together with entrained solids, passes upwardly through a second grid 22 into a fluidized bed 24 of finely-divided low-carbon content solids forming a well-defined upper level 25. The desired fluidization of solids bed 24 is accomplished by a proper control of the superficial velocity of the gas mixture flowing upwardly through grid 22.

The solids in bed 24 are preferably kept at carbon concentrations approaching zero in order to promote efficient combustion of CO to $CO_2$, at temperatures which may vary between about 1600° and 2500° F. These solids may consist essentially of solid low-carbon combustion residue carried over from bed 13. Inert solid material, such as ash, sand, clay, etc. of proper particle size, may be supplied through line 27 either to establish the low-carbon bed or to counterbalance any carbon carried over from bed 13 or to control the temperature in bed 24. The particle size of the low-carbon solids in bed 24 may vary within about the same limits as that of the high-carbon solids supplied to bed 13.

However, in many cases a relatively smaller particle size of the low-carbon solids, as compared with the high-carbon solids, offers considerable advantages, as will appear more clearly hereinafter.

Flue gas now consisting essentially of $CO_2$ and $N_2$, if air is used as the oxidizing gas, and containing a small proportion of non-carbonaceous solids fines, passes upwardly to gas-solids separator 29 which may be of the centrifugal and/or electrical type. Separated solids are returned from separator 29 through line 30 to bed 24 and hot flue gas substantially free of solids leaves heater 10 through line 31 to be discarded or used in any desired conventional manner, for example by utilization of its sensible heat for preheating purposes in the present process or in any other manner.

Hot fluidized solids substantially free of carbon are withdrawn through overflow-standpipe 33. All or part of the solids withdrawn through pipe 33 may be recycled through lines 33a, 35 and 27 to bed 24 with the aid of an aerating gas, such as steam, supplied through line 34. On the other hand, a substantial portion of the solids in pipe 33 may be withdrawn from the system through line 37 to be used, if desired, substantially at the temperature level of bed 24 as a heat carrier for any heat-consuming operation. Particularly in the latter case, it is preferable to maintain the temperature of low-carbon bed 24 at a desired level by recycling a portion of the solids by way of line 33a and 35 through a heat withdrawal device, such as steam boiler 36. In this manner, the temperature of bed 24 may be prevented from rising too high and, simultaneously, valuable low-cost steam may be produced.

The superficial velocity of the gases passing through beds 13 and 24 is controlled to establish the desired fluidization and depends largely on the particle size of the solids to be fluidized. In general, operative velocities fall within the range of about 0.5 to 10 ft. per second.

In the drawing, heater 10 is shown as having a uniform diameter. However, it will be understood that the diameters of the various heater sections 13, 17 and 24 may differ in order to maintain gas velocities at the proper values with respect to the maintenance of levels 14 and 25, etc. The arrangement of the heater may be further modified by the use of several superimposed low-carbon beds of the type of bed 24 with the noncarbonaceous, preferably cooled, solids flowing to the top bed and proceeding downward to the lower beds countercurrent to the materials rising from the high-carbon bed 13. It is also within the scope of our invention to provide separate vessels for the various fluidized solids beds described above.

It will be readily appreciated from the foregoing that the process of our invention affords most efficient heat generation by complete combustion of all reacted carbon to $CO_2$. In addition, the heat generated may be made available at least at two different temperature levels and in the form of sensible heat of solids of relatively high down to substantially zero carbon content, which may be used separately in accordance with their carbon content and temperature or in suitable mixtures to supply heat to heat-consuming operations at any desired levels of temperature and carbon concentration. These and other advantages are particularly significant in connection with the embodiments of the present invention illustrated in Figs. 2 and 3.

In Figs. 2 and 3 our invention is illustrated in connection with the conversion of solid fuels into more valuable fluid fuels by endothermic conversion, such as carbonization and gasification. It should be understood, however, that our invention embraces any heat-consuming reaction which may be supported with respect to heat balance by the sensible heat of carbonaceous or non-carbonaceous solids.

Referring now in detail to Fig. 2, the system shown therein essentially comprises a carbonizer 10, a heater 25 and a gas generator 45. Solid carbonizable fuel, such as carbonization coal or any other carbonizable solid, in a finely-divided state having a particle size which may vary from less than 200 mesh up to ¼ and ½ inch size is passed from feed hopper 1 by any suitable conveying means such as standpipe 2 which may be aerated through line 3 with a fluidizing gas, such as steam, flue gas, etc., to dispersing chamber 4 where it is suspended in more fluidizing gas supplied through line 5. For the purpose of starting up the process, the fluidizing gas and/or the coal may be preheated to temperatures ranging from 800° to 1500° F. by conventional means not shown. The fluidized coal suspension is passed under the pressure of standpipe 2 through line 6 into the lower conical section 8 of an essentially cylindrical carbonizer 10. The cylindrical section of carbonizer 10 is separated from the conical bottom section 8 by a distributing grid 9 through which the coal suspension passes into carbonization zone 12 to form therein a dense, ebullient, fluidized mass of solids having a well-defined upper level 13. In carbonization zone 12 the coal is maintained at carbonization temperatures ranging from about 800° to about 2200° F., preferably of about 1000° to 1400° F., by heat supplied from heater 25, as will appear more clearly hereinafter. Volatile carbonization products are withdrawn overhead through a conventional gas-solids separator 15 which serves to separate entrained solid fuel fines and to return the same through pipe 17 to zone 12. Volatile carbonization products substantially free of solids fines leave separator 15 through line 18 to be passed to storage or further processing to recover such valuable products as hydrocarbon gases, motor fuels, heavy hydrocarbon oils, tar, ammonia, and other carbonization products.

Solid fluidized coking residue, such as coke, is withdrawn from zone 12 through standpipe 20 and passed to dispersing chamber 22 wherein it is suspended in an oxidizing gas, such as air and/or oxygen, which is supplied through line 23 and which may be preheated, particularly during the starting period, to temperatures ranging from 1600° to 2500° F. The amount of oxidizing gas supplied is preferably somewhat less than that required for a complete combustion of the carbon of the coke to CO and $CO_2$. The coke suspension formed in chamber 22 is passed under the pressure of standpipe 20 through line 24 into heater 25 which may have the same construction as heater 10 of Fig. 1 or any of its modifications described in connection with Fig. 1. As shown in Fig. 2, heater 25 is provided with lower and upper distributing grids 26 and 28, respectively, supporting a fluidized coke bed 30 and an fluidized low-carbon solids bed 32, respectively. The operation of heater 25 is substantially as outlined above in connection with heater 10 of Fig. 1. In zone 30 a portion of the carbonaceous constituents of the coke is converted into CO and $CO_2$ by the oxidizing gas supplied through line 23 to establish in zone 30 a temperature of between about 1200° and 2200° F., preferably between 1600° and 2000° F. The combustion gases together with some entrained small-sized low carbon combustion residue pass upwardly through free space 34 to be enriched, if desired, with oxidizing gas through line 35. The mixture which now contains sufficient oxygen to convert all CO and $CO_2$ passes through grid 28 into the fluidized low-carbon solids bed 32 where complete combustion of substantially all combustible constituents to $CO_2$ takes place, as outlined above, at temperatures ranging from about 1600° to about 2500° F. The fluidized solids bed 32 consists essentially of low-carbon combustion residue carried up from zone 30 and of solid gasification residue recirculated from gas generator 45, as will appear hereinafter. Additional inert solids may be supplied from an extraneous source through line 36. Hot flue gas is withdrawn overhead through gas-solids separator 38 and line 39 while separated solids fines may be returned through line 37 to bed 32.

Fluidized solid combustion residue containing between about 2% and 30%, preferably about 10% to 25%, of carbon is withdrawn from zone 30 through standpipe 40. A minor portion, usually not more than about 25%, of the solids in pipe 40 is passed at the temperature of zone 30 through line 41 to carbonization zone 12 to supply at least a portion of the heat required for carbonization. The major portion of the solids in pipe 40 is passed through line 42 to the gasification zone 43 of gas generator 45 which has a construction similar to that of carbonizer 10. The solids in gasification zone 43 supported by grid 44 form a dense suspension, with an upper lever 46, fluidized by steam supplied through line 47 and the gases generated by the reaction between the carbon and the steam. The amount of steam supplied such be sufficient to convert enough of the carbon present in zone 43 to produce the desired amount of CO and $H_2$, at temperatures between the approximate limits of 1400° and 2400° F., preferably between about 1600° and 1800° F. Most of the heat required a support the gasification reation is supplied by the sensible heat of the solids withdrawn from zone 30 of heater 45. Fuel gas, consisting essentially of CO and $H_2$ in water gas proportions, is withdrawn from generator 45 overhead through separator 49 and line 50, separated solids being returned through line 48 to zone 43. The gas withdrawn through line 50 may be used as a fuel or for the synthesis of hydrocarbons or any other desired purpose.

Solid fluidized gasification residue is withdrawn through standpipe 52 and passed to dispersing chamber 54, if desired after further aeration by way of line 53. The solids are dispersed in chamber 54 in a fluidizing gas, such as flue gas, from the system supplied through lines 55 and 56, and passed under the pressure of standpipe 52 through line 70 back to zone 30 of heater 25. If desired, the solid gasification residue may be passed through a heat withdrawal device such as steam boiler 59, prior to its entry into heater 25, in order to control the temperature therein. Part of the residue withdrawn through line 70 may be passed thorugh line 58 to low-carbon zone 32 of heater 25, but the quantity so returned may not be so much as to raise the carbon content of this zone to an undesirably high level.

Fluidized, essentially non-carbonaceous solids are withdrawn from heater zone 32 through standpipe 60 and are now available to supply additional heat at the high temperature level of zone 32 to the carbonization and gasification reactions. For this purpose, a minor portion of the solids in pipe 60, usually amounting to not more than 20%, is diverted through pipe 61 and fed to carbonizing zone 12 of carbonizer 10. A further portion of the hot, substantially non-carbonaceous solids is fed through line 62 to the gasification zone 43 of generator 45. As a result of the high temperature and essential inertness of these solids and due to the supply of hot carbonaceous solids from heater zone 30, as described above, the amount of non-carbonaceous solids supplied to the carbonization and gasification zones may be relatively small and amount to a mere fraction, say 5% to 20%, of the carbonaceous solids supplied from heater zone 30. The temperature of the non-carbonaceous solids in pipe 60 may be maintained at the desired level by recirculating a portion thereof through lines 64, 65, steam boiler 66 and line 36 back to zone 32 with the aid of an aerating gas supplied through line 67. Excessive build-up of solids in the system may be prevented by suitable bleeding of ash through line 57 from standpipe 52 or from many other suitable point of the system.

The embodiment of our invention illustrated in Fig. 2 permits not only complete combustion of heater carbon to $CO_2$ and thus most efficient heat generation and supply for the reaction zones 12 and 43 but, in addition, operation of these reaction zones at the most desirable carbon concentration which may be maintained at any desirable level by a proper control of the separate solids streams supplied from heater zones 30 and 32, respectively. The process is thus highly flexible, completely self-supporting with respect to heat balance, and may be operated as a fully continuous process by a continuous feed of reactants and a continuous withdrawal of solid and fluid reaction products.

In accordance with a more specific modification of the embodiment of our invention illustrated in Fig. 2, care is taken that the carbonaceous fuel is charged to the system, and ultimately to the high-carbon bed of the heater, in relatively large-sized particles while maintaining the non-carbonaceous solids circulated through the system in a size range considerably smaller than that of the carbonaceous material. Velocities in the high-carbon content bed of the heater are maintained at such rate that the small-sized material is elutriated from that bed and carried into the low-carbon bed wherein it may be kept by virtue of a lower superficial velocity of the gas or the like. Means for accomplishing thils effect are well known in the fluidizing art. For example, the upper bed 32 of heater 25 may have a larger cross-section than the lower bed 30. In many cases the carbonaceous material charged in relatively large size is disintegrated in operation to a size in the range of the low carbon content component. This will normally not interfere with operation of the process, since during the process of disintegration the carbon content of the combustible material is usually reduced and the fines produced in this way are largely ash, which in turn is suitable as the low carbon content fluidized solids component. In this operation the non-carbonaceous portion should mostly be of 80 microns particle size or less, preferably in the range of 20-40 microns. The carbonaceous material is suitably charged to the system in sizes up to ¼ to ½ inch or thereabouts, although it may be desirable, especially in starting the plant, to include a significant proportion of material taken to 200–400 microns particle size. In this manner, the supply of extraneous non-carbonaceous solids to the system is made practically superfluous.

The embodiment of our invention illustrated in Fig. 2 permits of numerous other modifications. For example, all or a part of the coke from carbonizer 10 may be fed directly to generator 45 through lines 20, 24, 68 and 69. In this case, the carbon content of the gasification residue will be relatively high and it may be circulated through lines 52 and 70 to the lower bed 30 of heater 25. The fluidizing gas supplied through lines 55 and 56 may be partly or completely replaced by an oxidizing gas for this purpose. It will also be understood that heater 25 may be operated together with either carbonizer 10 alone or generator 45 alone by a simple manipulation of the valves in lines 41, 42, 61 and 62 and, in the case of gas generation alone, by directing the solid fuel feed through line 69 to generator 45. Also, oxidizing gas may be supplied to carbonizer 10 and/or generator 45 to supply additional heat by partial combustion therein. Other modifications within the scope of our invention will occur to those skilled in the art.

In Fig. 3 the embodiment of our invention described with reference to Fig. 2 is illustrated by a modification involving a variation of the directions of circulation of fluidized solids between the carbonizer, heater and gas generator. The reference numerals of Fig. 2 are used to designate similar parts of the system illustrated in Fig. 3. Referring now to Fig. 3, solid from hopper 1 is fluidized in line 2 by gas supplied through line 3, and fed downwardly to carbonizing zone 12 fluidized by gas supplied through line 6. Coke is withdrawn through pipe 20, suspended in oxidizing gas in chamber 22 and passed through line 24 upwardly to bed 30 of heater 25. High-carbon solids are withdrawn downwardly from bed 30 through pipe 40 and low-carbon solids from bed 32 downwardly through pipe 60 to be used as explained in connection with Fig. 2. However, the feed of solids to generator 45 now takes place in upward flow through pipe 42a after the addition of steam through line 47, under the pressure of the standpipes 40 and/or 60. The return of solids from generator 45 to heater beds 32 and/or 30 is accomplished by downward flow through pipes 52, 70 and 58. In all other respects the operation of the system is as outlined with reference to Fig. 2. The arrangement of Fig. 3 affords particular advantages, for example, in that steam is used to carry solids to the highest vessel instead of air, as in Fig. 2, thereby reducing compression load for the operation.

The process of our invention affords the further advantage that the circulation rate and particle size of the non-carbonaceous solids may be so controlled as to reduce substantially the blowout of valuable carbonaceous material from the carbonization and gasification zones by increasing the inert component of the entrained solid fines. Our process may be carried out at slightly reduced, atmospheric or slightly elevated pressures, ranging preferably from 25 to 75 lbs. per sq. in. gauge. The circulation rates of carbonaceous and non-carbonaceous solids to the carbonizer and gas generator may vary within wide limits, depending on temperature gradients and carbon concentrations involved. In general, good results may be obtained by circulating 25–200 pounds to the generator and 1–10 pounds to the carbonizer per pound of coal charged.

Our invention will be further illustrated by the following specific example.

*Example*

Using equipment arranged as in Fig. 2, each ton of ground coal charged to the system from hopper 1 and coked in carbonizer 10 at about 1200° F. is supplied with heat from about 1 ton of hot fluidized solids from line 41 and 1 ton from line 61. About 0.75 ton of fresh coke together with the 2 tons of circulating solids are withdrawn through line 200 and charged to heater 25 via line 24 with 2000 cu. ft. of air, whereby, in conjunction with about 60,000 cu. ft. of air introduced via lines 55, 56 and 70, the withdrawal of about 90 tons of solids through line 42, and the carryover of low carbon, fine ash particles through zone 34 into zone 32, a temperature of about 1900° F. is maintained in zone 30. The relatively high-carbon fluidized solids supplied to generator 45 through line 42 are augmented with about 10 tons of low-carbon solids through line 62, and 1500–2000 pounds of steam are introduced through line 47 to produce in all a water gas containing about 50,000 cu. ft. of CO+$H_2$ at a temperature of approximately 1800° F., which is removed through line 50 for utilization elsewhere. Sufficient solids to maintain level 46 are withdrawn through line 52, of which about 95 tons are returned with 57,000 cu. ft. of air to zone 30 via line 70, i. e., at such rate as to maintain the upper level of zone 30, and about 5 tons with 3000 cu. ft. of air via line 58 to zone 32, in order to maintain the upper level thereof. From 2000 to 5000 cu. ft. of air are introduced through line 35 in addition, whence the temperature of zone 32 is maintained at about 2000° F. About 10 tons of fluidized solids are removed through line 64, cooled in waste heat boiler 66, and returned via line 36. If the CO content of flue gas from line 39 becomes excessive, circulation and heat withdrawal through waste heat boiler 66 are increased, return of generator solids through line 58 decreased and through in 70 increased together with corresponding changes in withdrawal proportions through 40 and 60, and, if necessary, inert solids are fed through 36. Ash not otherwise eliminated from the system is disposed of at any convenient point.

While the foregoing description and exemplary operations have served to illustrate specific applications and results of our invention, other modifications obvious to those skilled in the art are within the scope of our invention. Only such limitations should be imposed on our invention as are indicated in the appended claims.

We claim:

1. The process of converting solid carbonaceous material into valuable volatile fuels, which comprises passing finely-divided carbonaceous material through a circuit comprising an endothermic conversion zone and a combustion zone, maintaining said material as a mass of fluidized solids in said conversion and combustion zones at elevated temperatures suitable for the production of volatile fuels from said materials, maintaining a substantial positive temperature gradient from said conversion zone to said combustion zone, feeding fresh carbonaceous solids of fluidizable particle size to said conversion zone, recovering a volatile fuel from said conversion zone, passing finely divided solid conversion residue from said conversion zone to said combustion zone, maintaining in said combustion zone at least two separate superimposed fluidized beds of solids, supplying said residue to a lower one of said beds so as to maintain a relatively high carbon concentration in said lower bed, maintaining in an upper one of said beds a fluidized mass of refractory solids containing carbon in relatively low concentration, not exceeding 5%, while adding thereto extraneous non-carbonaceous refractory solids from a source other than the ash particles leaving said lower bed, subjecting said residue to combustion in said lower bed with an oxidizing gas to produce a combustion gas containing substantial amounts of CO, passing said combustion gas in the presence of free oxygen and substantially at the temperature of said lower bed upwardly from said lower bed directly into a lower portion of said upper bed at combustion conditions conducive to burn CO completely to $CO_2$ at a temperature substantially higher than said lower bed temperature, and passing finely divided solids highly heated in said combustion zone from the latter separately from said combustion gas to said conversion zone to supply heat required in said conversion zone.

2. The process of claim 1 in which said highly heated solids comprise solids withdrawn from said upper bed.

3. The process of claim 1 in which said highly heated solids comprise solids withdrawn from said lower bed.

4. The process of claim 1 in which solids from said lower bed are carried by said combustion gases into said upper bed.

5. The process of claim 1 in which said fresh solids are carbonizable and said conversion zone is a carbonization zone.

6. The process of claim 1 in which said conversion zone is a gasification zone for the conversion of carbonaceous solids with steam to produce CO and $H_2$.

7. The process of claim 1 in which said combustion gas is passed consecutively through more than one of said fluidized refractory beds.

8. The process as claimed in claim 1 in which the temperature of a bed of low carbon concentration is controlled by circulating a portion of the solids thereof through a heat exchange device and back to said bed of low carbon concentration.

9. The process of converting solid carbonaceous material into valuable volatile fuels, which comprises passing finely-divided carbonaceous material through a circuit comprising a carbonization zone, an endothermic gasification zone and a combustion zone, maintaining said material as a mass of fluidized solids in said carbonization, gasification and combustion zones at elevated temperatures suitable for the production of volatile carbonization products and fuel gases from said material, maintaining substantial positive temperature gradients from said carbonization zone to said gasification zone and from said gasification zone to said combustion zone, feeding carbonizable solids of fluidizable particle size to said carbonization zone, recovering volatile carbonization products from said carbonization zone, passing finely-divided solid carbonization residue from said carbonization zone to said combustion zone, subjecting said residue to combustion in said combustion zone with a free oxygen-containing gas in a fluidized solids bed of high carbon concentration at a combustion temperature to produce a combustion gas containing substantial amounts of CO, passing said combustion gas in the presence of free oxygen through a fluidized refractory bed containing carbon in relatively low concentration not exceeding 5% to burn CO to $CO_2$ at a temperature substantially higher than said last-named combustion temperature, while adding to said refractory bed extraneous non-carbonaceous refractory solids from a source other than the ash particles leaving said bed of high carbon concentration, withdrawing highly heated finely-divided solids from said refractory bed and said bed of high carbon concentration separately from combustion gases, passing a portion of said withdrawn solids to said gasification zone to supply heat and carbon required in said gasification zone, passing finely-divided solid gasification residue from said gasification zone to said bed of high carbon concentration, and passing highly heated finely-divided solids from said combustion zone to said carbonization zone.

10. The process of claim 9 wherein at least a portion of said solid carbonization residue is passed directly to said gasification zone.

11. The process of claim 9 wherein said highly heated solids passed to said carbonization zone comprise solids from said refractory bed.

12. The process of claim 9 wherein said highly heated solids passed to said carbonization zone comprise solids withdrawn from said bed of high carbon concentration.

13. The process of claim 9 wherein said combustion gas is passed consecutively through more than one of said refractory beds.

14. The process of claim 9 in which a portion of said solid gasification residue is charged to said fluidized refractory bed.

15. The process of generating heat by the combustion of solid carbonaceous materials with oxidizing gases and supplying the heat generated to a heat consuming operation which comprises maintaining in a combustion zone at least two separate superimposed dense turbulent fluidized beds of solids, maintaining in a lower one of said beds a relatively high carbon concentration by supplying carbonaceous solids thereto, maintaining in an upper one of said beds a fluidized mass of refractory solids containing carbon in relatively low concentration not exceeding 5%, while adding thereto extraneous non-carbonaceous refractory solids from a source other than the ash particles leaving said lower bed, subjecting carbonaceous solids to combustion in said lower bed to produce combustion gases comprising a substantial proportion of CO, passing said combustion gases in the presence of free oxygen and substantially at the temperature of said lower bed upwardly from said lower bed directly into a lower portion of said upper bed at combustion conditions conductive to substantially complete conversion of carbon monoxide present to carbon dioxide by said free oxygen at a temperature substantially higher than said lower bed temperature, withdrawing individual solids streams from said beds separately from upflowing gases and supplying heat to said operation in the form of sensible heat contained in at least one of said solids streams withdrawn from said beds.

16. The process of claim 15 in which the flow velocity of said withdrawn combustion gases is so controlled that substantial amounts of solids of relatively high carbon concentration are entrained from said lower bed in said combustion gases and carried into said upper bed.

17. The process of claim 15 in which fresh oxidizing gas is added to said upper bed.

18. The process of claim 15 in which said combustion gases are passed consecutively through more than one of said upper beds.

19. The process of claim 15 in which said heat consuming operations comprise the gasification of solid carbonaceous material.

20. The process as claimed in claim 15 wherein the particle size of the solids in said lower bed is larger than that of the solids in said upper bed and the superficial velocity of the gases in said lower bed is higher than that of the gases in said upper bed.

21. The process as claimed in claim 15 in which said heat-consuming operations comprise carbonization of solid carbonaceous materials.

22. The process of generating heat by the combustion of solid carbonaceous materials with oxidizing gases and supplying the heat generated to a heat consuming operation which comprises maintaining in a combustion zone at least two separate superimposed dense turbulent fluidized beds of solids, maintaining in a lower one of said beds a relatively high carbon concentration by supplying carbonaceous solids thereto, maintaining in an upper one of said beds a fluidized mass of refractory solids containing carbon in relatively low concentration not exceeding 5% while adding thereto extraneous non-carbonaceous refractory solids from a source other than the ash particles leaving said lower bed, subjecting carbonaceous solids to combustion in said lower bed to produce combustion gases comprising a substantial proportion of CO, passing said combustion gases in the presence of free oxygen and substantially at the temperature of said lower bed upwardly from said lower bed directly into a lower portion of said upper bed at combustion conditions conducive to substantially complete conversion of carbon monoxide present to carbon dioxide by said free oxygen and supplying heat to said operation in the form of sensible heat contained in at least one of said solids streams withdrawn from said beds.

FRANK T. BARR.
BRUNO E. ROETHELI.
WALTER G. SCHARMANN.

REFERENCES CITED

The following references are of record in the file of this patent:

UNITED STATES PATENTS

| Number | Name | Date |
|---|---|---|
| 1,840,649 | Winkler et al. | Jan. 12, 1932 |
| 2,091,240 | Johnson et al. | Aug. 24, 1937 |
| 2,341,193 | Scheineman | Feb. 8, 1944 |
| 2,357,901 | Lewis et al. | Sept. 12, 1944 |
| 2,397,485 | Hemminger | Apr. 2, 1946 |
| 2,406,810 | Day | Sept. 3, 1946 |
| 2,480,670 | Peck | Aug. 30, 1949 |
| 2,482,187 | Johnson | Sept. 20, 1949 |
| 2,509,866 | Hemminger | May 30, 1950 |

FOREIGN PATENTS

| Number | Country | Date |
|---|---|---|
| 632,466 | France | Oct. 10, 1927 |